United States Patent Office 2,924,230
Patented Feb. 9, 1960

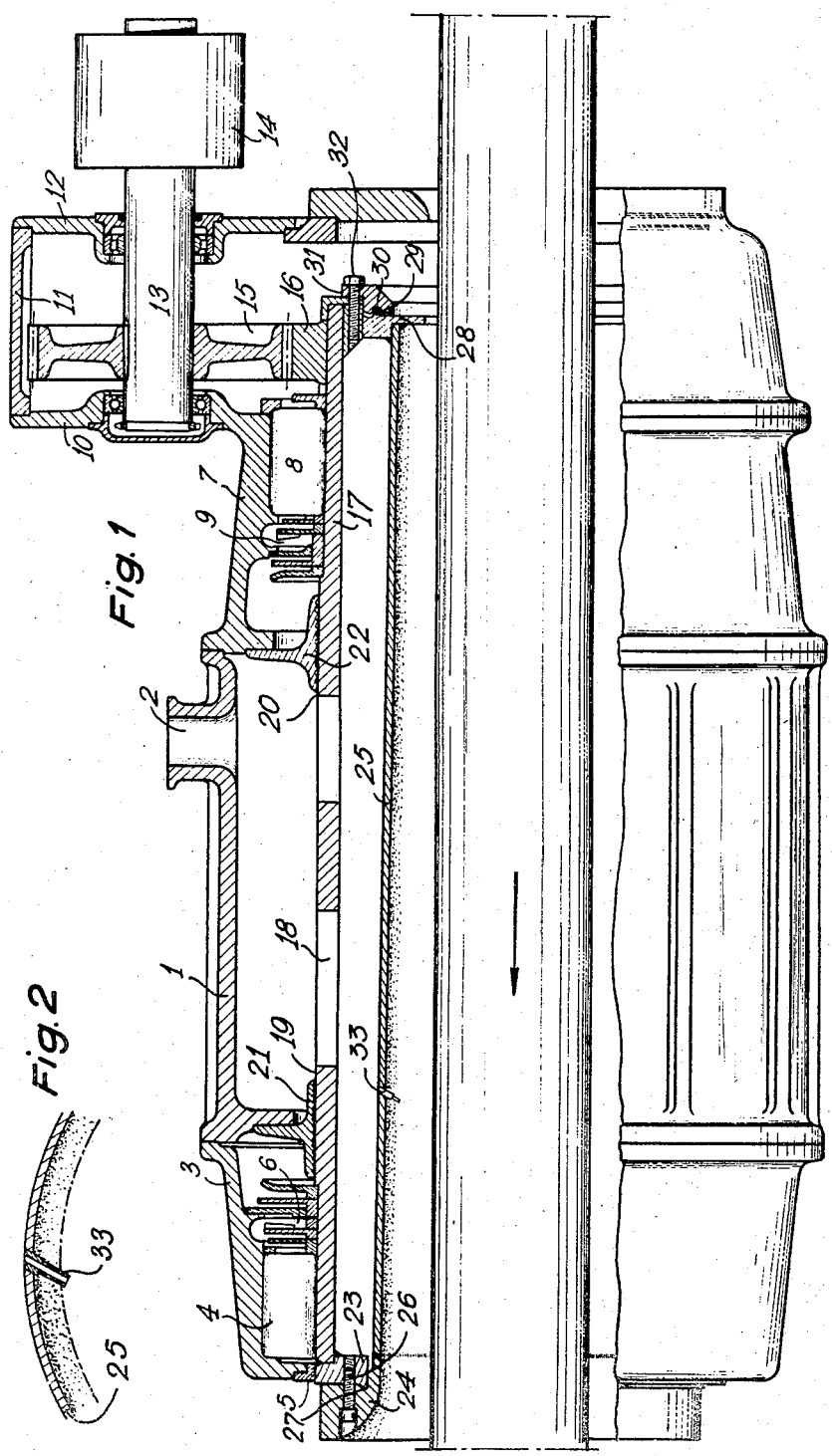

2,924,230

MACHINE FOR CONTINUOUS HARDENING

Pierre Marie Louis Dessarts, Paris, France, assignor to Heurtey & Cie, Paris, France Application March 6, 1958, Serial No. 719,666

Claims priority, application France March 15, 1957

9 Claims. (Cl. 134—122)

The present invention concerns a machine intended to provide continuous hardening of cylindrically shaped bodies of any desired length.

For these products it is necessary to obtain a regular hardening by providing a uniform cooling of each straight section, which means eliminating or rendering negligible all parasitic phenomena such as an asymmetry in the distribution of the hardening fluid through the action of gravity, for example.

To harden small parts like gear wheels, a simple solution is to rotate the part to be hardened about its axis. This method, however, is hardly practicable when heavy or bulky parts are to be treated.

The present invention enables this result to be achieved with success and the drawbacks inherent in conventional layouts to be avoided.

For this purpose, the invention has for object a machine for the continuous hardening of cylindrical members of any length, characterised by the fact that it comprises a rotatable tubular hardening chamber equipped with rotatable tubular hardening fluid distributing nozzles directed towards the member to be hardened which itself travels axially within said chamber, said chamber being fixed to a rotatable tubular body forming a distribution chamber which is housed within a fixed hardening fluid distributor and rotated by means of a driving gear.

The following description, considered in connection with the accompanying drawings given only by way of non limitative example, will enable the particular features of the invention and the operation of the machine constructed in accordance therewith, to be readily understood. In said drawings:

Fig. 1 is a diametral section of a hardening machine according to the invention.

Fig. 2 illustrates, on a larger scale, the radial disposition of the hardening fluid distributing nozzles.

The hardening machine as illustrated comprises a casing 1 fixed to any appropriate support and which communicates with the source of hardening fluid by an external union 2. One end of casing 1 which is approximately cylindrical is connected by a flange to a bearing housing 3 containing rollers 4 protected externally by a dustcap 5 and internally by baffles 6.

The opposite end of casing 1 is also connected by a flange to a second bearing housing 7 enclosing rollers 8 protected by internal baffles 9. The bearing housing 7 is integral with the flange 10 of a driving gear box housed within a casing 11 closed by a lid plate 12, while the flange 10 and the lid plate 12 carry the roller-bearings of a shaft 13 driven by means of a pulley 14. The shaft 13 carries a gear wheel 15 which meshes with a spur wheel 16 centered on the longitudinal axis of the casing 1. This spur wheel 16 is mounted at the end of a distribution drum 17 supported by the rollers 4 and 8. This distribution drum is pivoting and communicates with the interior of the casing through large ports 18, the area embodying the ports 18 being bounded by two sealed bearing surfaces 19 and 20 surrounded by linings 21 and 22, respectively. The lining 21 is secured to an interval flange provided on one of the ends of casing 1, while lining 22 is secured to an end flange integral with the bearing housing 7.

The drum 17 carries at one end a ring 23, on which is secured a flanged lip 24 of a hardening drum 25, a sealed joint being obtained by means of bolts 26 which tighten up a seal 27 housed inside an annular groove in the lip 24, this seal being compressed against the bottom of the groove by a mating lip along the rim of ring 23.

The opposite end of drum 25 is equipped with a flat ring 28 which, by means of an annular rib 29, tightens a seal 30 located within a groove formed in the surface of a collar 31 attached by means of bolts 32 to an internal end reinforcement of drum 17.

Thus, the sealing of the distribution chamber provided between drums 17 and 25 is obtained by the above mentioned seals and the tightening effect of bolts 26. In consequence it is a simple matter to change the hardening cylinder without changing the distribution drum, in accordance with the diameter of the member to be treated and the hardening law to be applied.

The hardening drum 25 is adapted to project streams of liquid and for this purpose embodies nozzles 33, the number and distribution of which depend on the result it is desired to obtain for the required degree of hardening. It would be preferable to insert through drum 25 the nozzles 33, of which one only is shown in the drawings, in an oblique direction relative to a radius of the cylinder constituting the drum 25 and also in an oblique direction relative to a diametrical plane of said cylinder.

The length of the projection provided for the nozzle inside the drum 25 limiting the hardening chamber is so chosen that it is greater than the thickness of the liquid vein pressed against the inner wall of this drum by centrifugal force, so that non-restricted jets of liquid reach the sides of the member to be hardened. In order to facilitate and regulate the flow of this liquid vein, the flanged lip 24 is specially contoured, while ring 28 with its internal projecting rim prevents flow of a layer of liquid towards the other end of the apparatus.

The operation of such an apparatus is extremely simple and requires no further description. The member to be hardened is displaced axially in the direction of the arrow while the distribution drum and the hardening chamber are driven by the gears.

The advantages derived from the use of such an apparatus concern the evenness of the hardening; the hardening fluid is delivered symmetrically in the form of rotating jets and the hardening area remains symmetrical since the fluid is eliminated after initial contact with the part to be hardened.

A film of vapor, should the fluid be a liquid, cannot be produced in a continuous fashion on the member to be hardened since this film is periodically broken with high frequency as a result of the successive impacts of the jets.

The degree of hardening can be easily controlled without affecting the uniformity of the processing, by either adjusting the feed supply of the injector nozzles or modifying their number in operation for a given work, or by acting on both simultaneously.

It will be seen that the treated product is immediately covered over by a uniform and regular film of hardened material which subsequently acts, during processing, as a rigid envelope capable of resisting deformation.

Such an apparatus is capable of projecting a liquid or gaseous fluid of any desired type onto objects to be hardened.

It is to be understood that without departing from the scope of the present invention as set forth in the accompanying claims, other modifications may be brought to the particular embodiments which have been described above.

What I claim is:

1. A machine for the continuous hardening of cylindrical members of any length travelling therethrough comprising, in combination, a rotatable tubular hardening chamber within which the cylindrical member to be hardened travels, hardening fluid distributing nozzles inserted through the wall of said hardening chamber and directed towards said member, a rotatable tubular body surrounding, and fixed to, said hardening chamber for forming a distribution chamber, the wall of said tubular body being formed with ports, a fixed fluid distributor housing said tubular body and connected to a source of hardening fluid, and means for rotating said tubular body.

2. A machine, according to claim 1, wherein the axes of the nozzles are inclined in relation to a diametrical plane of the hardening chamber and also in relation to a radius inscribed in said diametrical plane.

3. A machine, according to claim 2, wherein the length of projection of the nozzles inside the hardening chamber is such that they emerge above the layer of hardening fluid which is spread inside said chamber by centrifugal forces.

4. A machine for the continuous hardening of cylindrical members of any length travelling therethrough comprising, in combination, a rotatable tubular hardening chamber within which the cylindrical member to be hardened travels, means for regulating the flow of hardening fluid through said hardening chamber, hardening fluid distributing nozzles inserted through the wall of said hardening chamber and directed towards said member, a rotatable tubular body surrounding, and fixed to, said hardening chamber for forming a distribution chamber, the wall of said tubular body being formed with ports, means for tightening up the junction between the hardening chamber and the tubular body, a fixed fluid distributor housing said tubular body and connected to a source of hardening fluid, bearings interposed between said tubular body and said fixed distributor, means for protecting said bearings against any leakage of hardening fluid, and means for rotating said tubular body.

5. A machine, according to claim 4, wherein the means for regulating the flow of hardening fluid through said hardening chamber comprise a spiller-ring secured to one of the ends of the hardening chamber, and an internal stopper-ring secured to the other end of said chamber and formed with a circular orifice the diameter of which is slightly greater than that of the cylindrical member to be treated.

6. A machine, according to claim 4, wherein the means for tightening up the junction between the hardening chamber and the tubular body comprises internal collars respectively secured to the ends of the tubular body, external rings respectively secured to the ends of the hardening chambers so that they bear axially in the same direction against said collars, tight seals interposed between said collars and said rings, and bolts for attaching said collars and rings, whereby the hardening chamber may be changed according to the dimensions of the cylindrical member to be treated without changing the rotatable tubular body.

7. A machine according to claim 4, wherein the rotatable tubular body is formed on either side of the ports with bearing surfaces on which bear the bearings and wherein the means for protecting said bearings against any leakage of hardening fluid comprises baffles interposed between the distributor and said bearing surfaces and located between the bearings, and linings secured to said distributor between said baffles and the ports of the tubular body.

8. A machine according to claim 4, wherein the means for rotating the tubular body comprises a spur wheel secured on the tubular body, a driving shaft supported by the fixed distributor and a gear wheel keyed on said shaft and in meshing engagement with said spur wheel.

9. A machine for the continuous hardening of cylindrical members of any length travelling therethrough comprising, in combination, a rotatable tubular hardening chamber within which the cylindrical member to be hardened travels, a spiller-ring secured to one of the ends of the hardening chamber, an internal stopper-ring secured to the other end of said chamber and formed with a circular orifice the diameter of which is slightly greater than that of the cylindrical member to be treated, hardening fluid distributing nozzles inserted through the wall of said hardening chamber and directed towards said member, a rotatable tubular body surrounding, and fixed to, said hardening chamber for forming a distribution chamber, the wall of said tubular body being formed with ports, internal collars respectively secured to the ends of the tubular body, external rings respectively secured to the ends of the hardening chambers so that they bear axially in the same direction against said collars, tight seals interposed between said collars and said rings, bolts for attaching said collars and rings, a fixed fluid distributor housing said tubular body and connected to a source of hardening fluid, bearings interposed between said tubular body and said fixed distributor, the rotatable tubular body being formed on either side of the ports with bearing surfaces on which bear the bearings, baffles interposed between the distributor and said bearing surfaces and located between the bearings, linings secured to said distributor between said baffles and the ports of the tubular body, a spur wheel secured on the tubular body, a driving shaft supported by the fixed distributor and a gear wheel keyed on said shaft and in meshing engagement with said spur wheel.

References Cited in the file of this patent

UNITED STATES PATENTS

| | | |
|---|---|---|
| 1,724,674 | Merseles | Aug. 13, 1929 |
| 2,776,230 | Scott | Jan. 1, 1957 |